United States Patent
Thoma

[15] 3,703,257
[45] Nov. 21, 1972

[54] CONDITION CONTROL SYSTEM AND INTEGRATED SENSOR AND FEEDBACK CHAMBER UNIT THEREFOR

[72] Inventor: Paul E. Thoma, Burlington, Wis.
[73] Assignee: Johnson Service Company, Milwaukee, Wis.
[22] Filed: March 31, 1970
[21] Appl. No.: 24,307

[52] U.S. Cl. ................................... 236/44, 236/82
[51] Int. Cl. ...................................... G05d 23/185
[58] Field of Search ........ 236/44, 84, 87, 44; 137/84, 137/85

[56] References Cited

UNITED STATES PATENTS

| | | | |
|---|---|---|---|
| 1,920,827 | 8/1933 | Wunsch | 236/82 |
| 2,274,741 | 3/1942 | Rolnick | 236/82 |
| 2,325,103 | 7/1943 | Bristol | 236/82 |
| 2,539,724 | 1/1951 | Buske | 236/82 |
| 2,675,819 | 4/1954 | Eckman | 236/82 X |
| 1,866,778 | 7/1932 | Smediker | 236/87 X |

*Primary Examiner*—Edward J. Michael
*Attorney*—Andrus, Sceales, Starke and Sawall and Arnold J. De Angelis

[57] ABSTRACT

An environmental system includes a condition-sensing unit for sensing humidity or temperature. The unit includes a closed feedback chamber having an outer flexible flat wall. A material responsive to the selected environmental condition to be controlled is attached to the flexible flat wall in spaced relation to the periphery of the flat wall and defines a flexible sensor wall with a controlled deflection in response to condition changes. The flexible sensor wall is also connected to a lid overlying a control port of a pneumatic relay to adjust the control air supplied to a fluid controller for operating of a conditioning device. The control air is also connected via a resistor or the like directly to the feedback chamber to provide a related feedback signal which repositions the flexible sensor wall to establish feedback and stabilize the control loop. A variable resistor is connected to exhaust the feedback signal for adjustment of the degree of feedback pressure.

7 Claims, 4 Drawing Figures

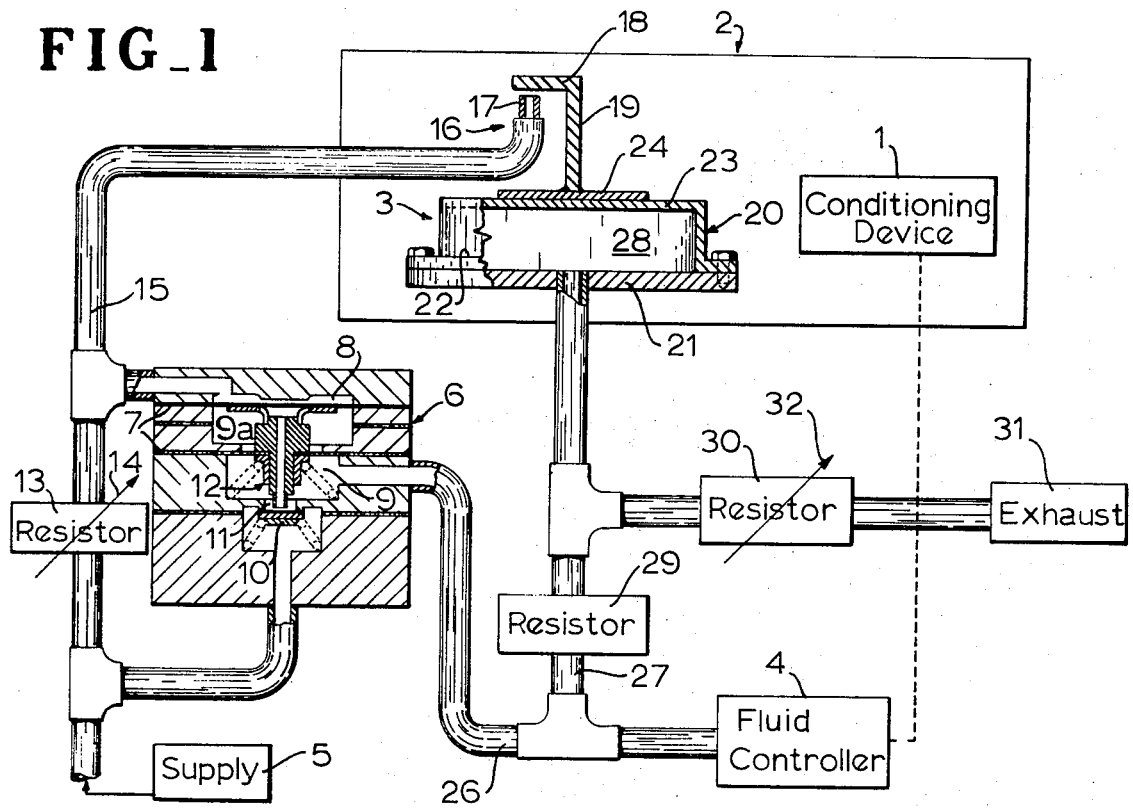
FIG_1
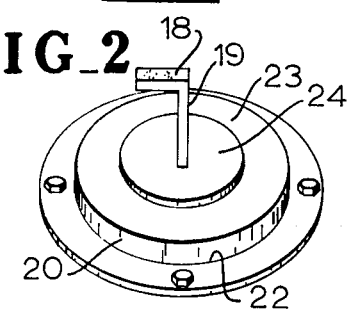
FIG_2
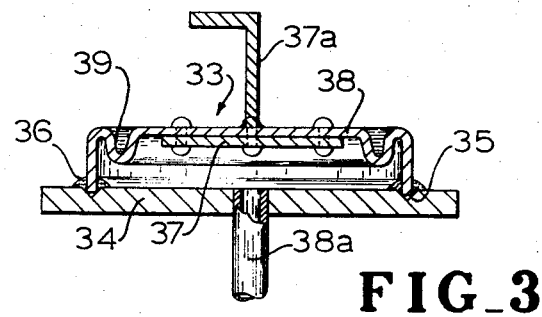
FIG_3
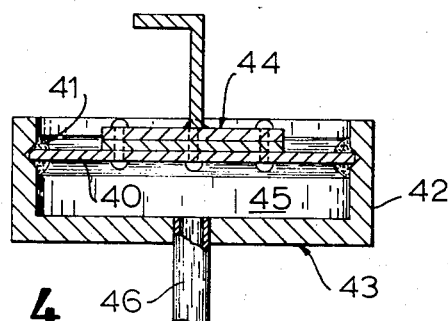
FIG_4
INVENTOR.
PAUL E. THOMA

CONDITION CONTROL SYSTEM AND INTEGRATED SENSOR AND FEEDBACK CHAMBER UNIT THEREFOR

BACKGROUND OF INVENTION

Fluidic and pneumatic control systems have many advantages particularly in environmental controls. In such systems, a condition-sensing element is interconnected to control a fluid flow or pressure which, in turn, is connected to actuate a control device for changing the sensed condition. Thus, in humidity and/or temperature environmental control systems to maintain an environmental condition, the condition-sensing element generally establishes a proportional physical deflection of a member in accordance with the sensed condition. The deflection, in turn, controls a fluid pressure control element, for example, a leak port unit of a pneumatic relay to thereby control the fluid flow or pressure to a control device. A pressure feedback system is normally connected into the control circuit to stabilize the operation of the control loop and provide the required sensitivity. Although such systems have been highly satisfactory, they have employed a sensing unit and a completely separate feedback unit, with the resultant expense and separate coupling.

SUMMARY OF THE PRESENT INVENTION

The present invention is particularly directed to a dual functioning sensor element which defines an integrated portion of a closed feedback chamber having a condition-sensing flexible or movable wall. The flexible or movable wall is connected to a fluid control element and positions such element to control the fluid output pressure and/or flow. A fluid feedback passageway couples the fluid output signal to the closed feedback chamber which functions to correspondingly position the flexible wall. Thus, the chamber with the movable wall provides the dual functions of sensing the condition and providing a corresponding physical movement and control signal and, simultaneously, in responding to a change in the fluid output signal provides the desired stabilizing feedback response.

In a particularly novel aspect of the invention, the sensing unit includes a closed chamber, at least one wall of which is a flexible member and which is sealed to adjacent side walls and a base wall to define an effectively fluid closed chamber. The flexible wall is rigidly mounted at its periphery and the bimaterial sensing material or unit is attached to the base member in spaced relation to the rigid mounting. Thus, the flexible wall of the feedback chamber is constructed and mounted for optimum results in accordance with the teaching of applicant's copending application entitled "Bi-Material Condition Sensing Means," filed Apr. 11, 1968, with Ser. No. 720,684 discloses a flexible wall defining an integral portion of the closed chamber. The flexible wall is connected to a control port lid for varying the opening of a control port of a pneumatic relay which establishes a related pilot signal pressure to position a main flow control diaphragm or the like of a fluid control means and thereby adjusts the control air or other operating fluid signal such as flow and/or pressure from the fluid control means to a controlled conditioning device. The pilot signal pressure is exhausted through the control port and the operating signal level is thus determined by the positioning of the control lid. The control air is also supplied via a resistor or the like directly to the feedback chamber to provide a related feedback signal which will, in turn, tend to reposition the flexible wall and thereby stabilize the control loop. A variable resistor is employed to bleed or exhaust the feedback signal for adjustment of the degree of feedback pressure.

Although the condition-sensing unit preferably employs the teaching of applicant's copending application and may, as noted therein, take a great variety of many different forms providing either a direct or reverse acting sensing unit, the flexible wall may employ a rigid or semi-rigid mounting as a part of a dual-functioning closed chamber. Applicant has also found that inserting a corrugated or convoluted portion in the flexible bi-material wall establishes a linear feedback relationship over a greater range of feedback pressures and thus improves the operation of the system.

The present invention has thus been found to provide a simplification and resulting cost reduction in a control system as a result of the dual functioning condition sensing element establishing and maintaining an output directly related to the condition and stabilizied through the common and direct feedback to the sensing element.

BRIEF DESCRIPTION OF DRAWING

The drawing furnished herewith illustrates the best modes presently contemplated by the inventor for carrying out the subject invention and clearly discloses the above advantages and features as well as others which will be readily understood by those skilled in the art from the following description of the illustrated embodiments.

In the drawing:

FIG. 1 is a schematic diagram of an environmental control system employing a dual functioning condition sensor and feedback diaphragm unit constructed in accordance with the present invention;

FIG. 2 is a pictorial view of the diaphragm unit shown in FIG. 1;

FIG. 3 is a further vertical section through a diaphragm unit which can be employed in a system such as shown in FIG. 1; and FIG. 4 is a similar vertical section to show another diaphragm unit construction suitable for use in the present invention.

DESCRIPTION OF ILLUSTRATED EMBODIMENTS

Referring to the drawing and particularly to FIG. 1, the present invention is shown applied to an environmental condition control system having a conditioning device 1 adapted to control a condition such as temperature or humidity within a room, building or other enclosure 2. A condition-sensing unit 3 is mounted within the room and connected to control the operation of a fluid controller 4, the output of which is connected to the condition-controlling device 1. Although any suitable fluid may be employed, air is generally used and the illustrated structure is hereinafter so described. The fluid controller 4 is any suitable pneumatic device interconnected to an air supply 5 by a pneumatic relay 6, which may be of a direct or reverse acting construction. In the illustrated embodiment, the relay 6 is a direct-acting diaphragm unit having a pair of spaced and centrally connected diaphragms 7 defining a pressure pilot chamber 8 above the one diaphragm and a transfer or output chamber 9 beneath the second diaphragm. An exhaust chamber 9a is formed between the two diaphragms 7. A central control port lid 10 overlies a supply port 11 to the output chamber 9 and to the air supply 5. The output chamber 9 is connected to the controller 4 with the pressure and flow transmitted being dependent upon the positioning of the lid 10 with respect to the port 11. A spring-loaded exhaust valve assembly 12 extends through the exhaust chamber 9a and the output chamber 9 with the lower end immediately adjacent the lid 10. The valve assembly 12 is attached to the diaphragm 7 and positioned by the relative pressures of the several chambers. As the pressure in chamber 8 increases, the diaphragms move downwardly, carrying the exhaust valve assembly with lid 10 and thereafter spacing the lid 10 from port 11. Conversely, a reduction in signal pressure retracts the assembly 12 and moves lid 10 toward port 11. The positioning of the lid 10 directly controls the pressure within the output chamber 9 and the pressure to the controller 4. The supply 5 is connected through a fluid resistor 13 to the chamber 8. The resistor 13 may be variable as shown diagrammatically by the arrow 14 to permit adjustment of the set point pressure. A control conduit or line 15 connects the output side of resistor 13 and thus the chamber 8 to a control or leak port unit 16 which, in turn, is connected to the condition-sensing unit 3 to provide a control in accordance with the sensed condition. The illustrated control port unit 16 includes the usual control port 17 connected directly to the control line 15. An inverted L-shaped member defines a control lid 18 overlying the control port 17 with the depending leg 19 interconnected to the sensing unit 3.

The sensing unit 3 preferably employs the teaching of applicant's copending application and in FIGS. 1 and 2 is constructed including an inverted, cup-shaped flexible member 20 formed of a suitable flexible diaphragm material. The peripheral edge of the cup-shaped member 20 is rigidly affixed and sealed to a cover and support member 21 as at 22 to define a generally tubular sensing chamber having the base wall 23 closing the one end and forming a planar movable wall. A material 24 having a distinctly different condition coefficient of expansion with respect to that of the flexible member 20 and particularly wall 23 is attached as by an integral complete interface bond to the central outer surface of the flexible wall 23 with the periphery in substantially spaced relation to the side walls to define a bimaterial sensing unit. The flexible member 20 including wall 23, for purposes of discussion, is described as formed of a relatively low condition expansion material and the sensing material 24 a relatively high condition expansion material. The base wall 23 then defines a flexible diaphragm which moves with and is positioned in accordance with the sensed condition. As the condition sensed increases, the wall 23 deflects outwardly and, conversely, as the condition sensed decreases, the wall 23 deflects inwardly. The relative condition expansion characteristic of the flexible wall 23 and material 24 may, of course, be reversed to provide an oppositely directed deflection.

The lower end of the leg 19 of the port lid member is rigidly secured to the center of the wall 23 and thus is positioned in accordance with the sensed condition. Thus, as the condition sensed decreases, the flexible wall moves inwardly of the chamber 28. This correspondingly draws the port lid 18 downwardly toward and over the control port 17 thereby restricting the exhausting of air from the connection to chamber 8 via the passageway 15 and port 17. As a result, the pressure of the signal increases with an increase in the signal applied to the pilot chamber 8 of the pneumatic relay 6. In the illustrated embodiment of the invention, this causes the lid 10 to move downwardly of the port 11, thereby increasing the pressure to the fluid controller 4 and providing an appropriate operation of the fluid controller 4 to actuate the conditioning device 1 to increase the condition within the room.

The reverse action occurs in response to an increase in the condition in the room.

In accordance with the illustrated embodiment of the invention, the conduit 26 connecting the output chamber 9 of the relay 6 to the fluid controller 4 is also connected to a feedback conduit 27 which is interconnected to apply a proportionate or selected percentage of the output fluid pressure to the chamber 28 defined by the unit 3.

An isolating resistor 29 is inserted in the line 27 and a variable feedback control resistor 30 is connected between the line 27 to the output side of the resistor 29 and an exhaust 31. The bleed resistor 30 is adjustable as diagrammatically shown by the arrow 32 to permit the varying of the amount of the feedback pressure. Thus, when the bleed resistor 30 is closed, a maximum feedback signal is transmitted to the chamber 28. Conversely, when the bleed resistor 30 is completely open, a minimum, essentially zero feedback signal is obtained. A corresponding or intermediate closure of the resistor 30 results in a corresponding proportional varying of the feedback to the chamber 28.

Thus, when the lid 18 moves towards the control port 17 to increase the output pressure to the fluid controller, as previously described, an increased pressure is also transmitted to the feedback chamber 28. The increased pressure within the chamber 28 causes the flexible diaphragm wall 23 of the bimaterial construction to move outwardly or upwardly in FIG. 1. This tends to move the control port lid 18 away from the control port 17 and thus partially modifies the effect of the condition sensing response and thereby stabilizes the control loop. A similar stabilizing action occurs when the lid 18 of the sensor moves away from control port 17 due to an increase in the condition sensed within the enclosure 2.

Applicant has found the dual-functioning sensor construction provides both positioning in accordance with the sensed condition as well as positioning in accordance with the feedback signal and results in a substantial simplification in construction while producing an improved reliability and response.

The basic concept of the present invention is the dual function of the condition-sensing response unit and, in particular, having the single element serving both as the condition-sensing element and the feedback diaphragm element. The unit, as previously noted, may, of course, take any one of a great number of different constructions.

For example, in FIG. 3, an alternative sensing unit construction is shown. In FIG. 3, a cup-shaped member 33 of a relatively low expansion material is interconnected to a rigid supporting wall 34. In FIG. 3, the peripheral edge, however, is secured with a semi-rigid seal including a generally V-shaped notch 35 within which the flat edge of the cup-shaped member 33 rests. A sealing material 36 such as a silicone rubber RTV adhesive and sealant is provided, filling the recess and overlapping the adjacent edge of the portion of the cup-shaped member 33 to establish a semi-rigid mounting and sealing of the cup-shaped member 33 to the wall 34. Furthermore, in FIG. 3, a high-expansion material 37 is shown located on the interior side of the base wall 38 to provide an opposite movement with respect to a condition change such as temperature wherein the expansion characteristic is not dependent upon absorption such as humidity. The embodiment of FIG. 3 also illustrates the applying of the high-expansion material by other than an integral, bonded material as in FIGS. 1 and 2. In FIG. 3, the material 37 is shown as a separate disc riveted, in air-tight relationship, to the central portion of the base wall 38. The leak port lid 37a is suitably secured to the exterior of member 33. A feedback line 38a is connected to wall 34 such that the member 33 simultaneously functions as the sensing means and the feedback means.

The embodiment of FIG. 3 illustrates a further improvement obtained with the formation of a corrugation 39 in the base of the cup-shaped member between the edge of the high-expansion material 37 and the side wall of the cup-shaped member 33. The corrugation results in a modified deflection as a result of the feedback pressure signal and, in particular, provides for a more linear deflection over a greater pressure range with the changes of the feedback pressure.

The unit of FIG. 3 otherwise basically operates in the same manner as that previously described with respect to the embodiments of FIGS. 1 and 2. The opposite location of the high expansion material to the interior side of member 33 in FIG. 3, however, reverses the direction of deflection of the flexible wall member with temperature condition changes and a corresponding reversal in the closing and opening of the control port 17. Thus, as the temperature decreases, the deflection outwardly increases to exhaust a greater amount of the pilot signal flow in line 15 and thus reduce the pressure in chamber 8. As a result, a decreased pressure signal would be supplied simultaneously to the fluid controller and the feedback line 27. Thus, the embodiment of FIG. 3 illustrates the modification to the basic element which reverses the action and response when compared with the first embodiment.

A further embodiment is shown in FIG. 4 where a flat spring member 40 is secured at the periphery by a semi-rigid seal 41 similar to that shown in FIG. 3 to the side walls 42 of a rigid wall cup-shaped base member 43. A bimaterial strip unit 44 having a high-expansion material and a low-expansion material in superimposed relationship is riveted to the central portion of the spring member 40. A feedback conduit 46 is connected to base member 43 and thus defines a chamber 45, similar to that shown in FIGS. 1 and 3. The embodiment of the invention will operate essentially in the same manner as that previously described with the element deflecting outwardly or inwardly depending upon the relative position of the high expansion and low-expansion material or elements of unit 44 with respect to the chamber 45.

Obviously, various combinations of the illustrated embodiments may be employed. For example, the structure of FIG. 4 may be provided with a bonded disc similar to that shown in FIG. 1 or the structure of FIG. 3 wherein member 40 would form one part of the condition sensing element. Similarly, other variations may be employed wherein the movable sensing member defines a flexible wall of a container to which the feedback signal is applied.

Various modes of carrying out the invention are contemplated as being within the scope of the following claims which particularly point out and distinctly claim the subject matter which is regarded as the invention.

I claim:

1. An environmental condition control system comprising a fluid control means having a fluid output means for establishing a fluid output operating signal, a feedback chamber means having a flexible wall portion, said flexible wall portion including an environmental condition sensing means having at least two material layers directly connected with said flexible wall portion to define a common bimaterial condition sensitive and fluid feedback element and establishing a mechanical movement for adjustably positioning said flexible wall portion directly in accordance with the sensed condition, means connecting said flexible wall portion to said control means and moving said control means in accordance with the position of said wall portion to correspondingly change the fluid signal, and a fluid feedback conduit means connected to said chamber means and to said fluid output means for transmitting the pressure of said operating signal in said output means directly as a fluid feedback signal to said chamber means and positioning of said flexible wall portion and said condition sensing means in accordance with the fluid feedback signal to correspondingly actuate said control means and reset said condition sensing means.

2. The condition control system of claim 1 including an adjustable fluid bleed means connected to the fluid feedback means to vary the proportion of the output fluid signal applied to said chamber.

3. The condition control system of claim 1 wherein said condition-sensing means deflects said flexible wall portion in accordance with the sensed condition, and said flexible wall portion includes an annular convoluted portion to establish linear proportional movement of the wall.

4. The condition control system of claim 1 wherein said fluid control means includes an adjustable fluid flow control means having a movable flow control element, means connecting said flexible wall portion to said element, said condition sensing means being a bimaterial condition-sensitive means establishing deflection of said wall portion in accordance with the sensed condition and corresponding positioning of said flow control element, said flexible wall portion is a flat planar wall having a first condition coefficient of expansion, a second material having a distinctly different coefficient of expansion and of a substantially smaller area is secured to the wall with the periphery of the second material spaced from the mounting of the wall to define said condition-sensitive means, said chamber being a generally tubular member with said wall defining an end wall, and said fluid feedback means including a fluid passageway means connected to said chamber in spaced relation to said end wall.

5. The condition control system of claim 4 wherein said movable wall includes an annular convoluted portion between said second material and the side wall of said chamber.

6. The condition control system of claim 1 wherein said fluid control means includes a fluid relay having a fluid signal input means to control the level of the operating signal and a bleed port connected to said input means, an adjustable control port lid element to vary the opening of said control port, and means connecting said movable wall to said control port lid element for positioning of said element in accordance with the fluid feedback signal and the sensed condition.

7. The condition control system of claim 6 wherein said chamber is essentially tubular and said wall portion defines one end, said wall portion being a single layer defining a first of said two material layers and having a second material bonded to the central portion thereof to define said condition sensing means deflecting said wall portion in accordance with the sensed condition, said feedback means including a fluid pressure passageway connecting the opposite end of said chamber to said fluid output means and a variable fluid resistor connecting said passageway to a reference pressure to adjust the proportion of the output pressure applied to said chamber.

* * * * *